July 4, 1933.  H. E. WARREN  1,917,172
SYNCHRONOUS MOTOR
Filed July 30, 1931

Inventor:
Henry E. Warren,
by Charles E. Tullar,
His Attorney.

Patented July 4, 1933

1,917,172

UNITED STATES PATENT OFFICE

HENRY E. WARREN, OF ASHLAND, MASSACHUSETTS, ASSIGNOR TO WARREN TELECHRON COMPANY, OF ASHLAND, MASSACHUSETTS, A CORPORATION OF MAINE

SYNCHRONOUS MOTOR

Application filed July 30, 1931. Serial No. 554,033.

My invention relates to synchronous motors, particularly those of the small non-self-starting type suitable for driving timing devices. The main object of the present invention is to provide a simple, inexpensive motor of the character described in which provision is made to facilitate easy synchronizing after the motor is started and to prevent the motor falling out of step due to sudden changes in line frequency or load variations. These objects are accomplished by providing a magnetic coupling between normally stationary portions of the stator field structure which permits of a slight amount of resilient rotation of a normally stationary low inertia salient pole portion of the stator during synchronizing operations and upon the occurrence of surges, thereby adding resiliency, which assists in the establishment and maintenance of synchronous operation.

In United States Patent No. 1,120,615, Harris, December 8, 1914, there is described a synchronous motor in which the entire normally stationary field structure is allowed to rotate slightly against the action of springs for providing resiliency. My invention is an improvement over the Harris arrangement in that no springs are necessary and only a very small portion of the field structure having low inertia is movable. My arrangement is, therefore, more effective, and, moreover, eliminates the necessity of flexible connections to the stator field winding, which is stationary in my motor.

Figure 1:
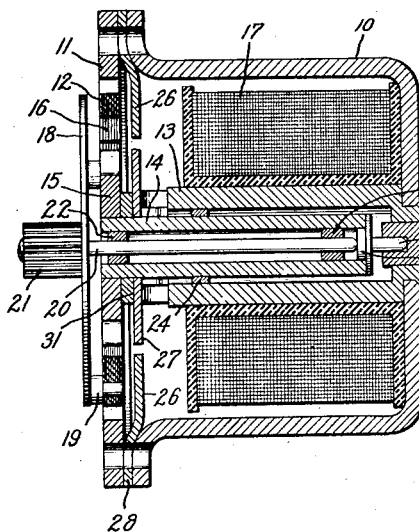
Figure 2:
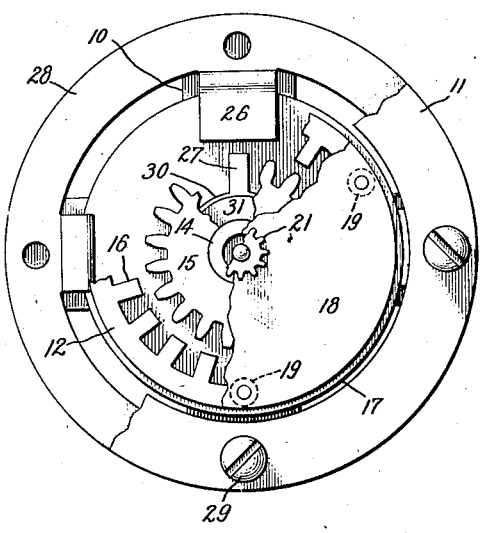

The features of my invention which are believed to be novel and patentable will be pointed out in the claims appended hereto. For a better understanding of the invention, reference is made in the following description to the accompanying drawing showing in Fig. 1 a sectional view of a motor embodying my invention, in Fig. 2 a broken end view of the same motor, and in Fig. 3 a complete side view of the same taken at right angles to Fig. 1.

Referring to the drawing, I have represented a small motor suitable for driving timing devices, the drawing being somewhat larger than twice the full size of similar motors which I have built for driving clocks. The stator of this motor includes a cup-shaped outer magnetic shell 10, which may be in skeleton form as represented. This portion comprises the supporting structure for the complete assembly. At the outer extremities of the four arms of this supporting structure is secured a circular magnetic piece 11, the smooth inner periphery of which extends inwardly and is closely adjacent to and surrounds the rotor 12. A central hollow magnetic piece 13 is secured to the base of the cup 10 and surrounds a second hollow magnetic member 14, which has secured to its outer end an outwardly extending salient pole magnetic member 15. The rotor 12 has inwardly projecting salient poles 16 equal in number to the teeth or poles of member 15. A single phase energizing winding 17 within the cup and surrounding the central telescoping core structure forces an alternating flux around the magnetic circuit described as follows: From core piece 13 across a small cylindrical air gap to the telescoping core piece 14, through the salient pole member 15, through the rotor 12 and the adjacent air gaps to the outer circular piece 12 and back through the skeleton framework 10.

The rotor 12 comprises a steel ring with the inwardly projecting salient poles 16 and is rotatively supported in the concentric air gap between members 11 and 15 by being secured to a non-magnetic disc 18 at three points 19 by suitable rivets. Disc 18 is secured to the rotor shaft 20 having a driving pinion 21. The shaft 20 is supported in guide bearings 22 and has a step bearing 23 inside of the core member 14.

Figure 3:
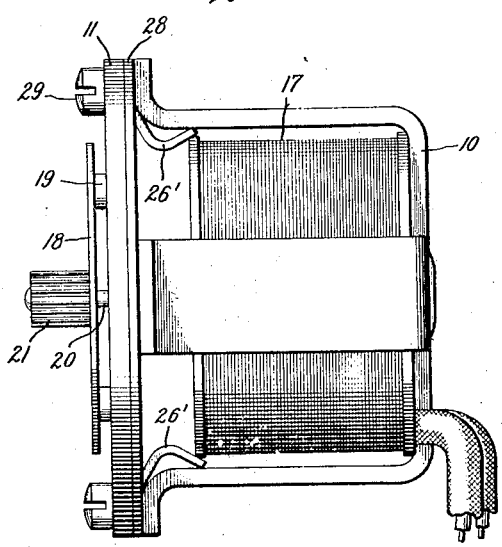

It will be noted that the stator portions 14 and 15 are mounted to be relatively rotatable by reason of the guide bearing 24 and a pivot bearing 25. The pivot of the latter bearing is secured to the inner end of the member 14 and runs in a non-magnetic plug 25' in the supporting structure 10. The guide bearing or sleeve 24 is of non-magnetic material, to prevent sticking tendency between the magnetic parts. The parts 14 and 15 are prevented from continuous rotation by reason of a magnetic coupling between 14 and the remainder of the stator. This coupling comprises the two wide magnetic poles 26 extending inwardly from the rim of the outer cup structure and two relatively narrow magnetic poles 27 extending outwardly from member 14. Poles 26 are portions of a magnetic ring 28 clamped between parts 10 and 11 by screws 29. This ring has four such projections, but two of them are turned back as shown in Fig. 3 at 26' to retain the coil 17 in place and consequently do not serve as magnetic poles. The poles 27 of this coupling are integral with a magnetic hub 30 secured to core member 14. This hub is spaced from the toothed flange 15, which is the salient pole stator element, by a spacing ring 31. Thus, we have the two sets of wide and narrow pole pieces 26 and 27 at diametrically opposite points of the motor between the pivoted part 14 and the stationary outer magnetic shell, and a limited amount of the motor flux passes through the relatively high reluctance path between these pole pieces in parallel to the lower reluctance path through the rotor. The path through the coupling is of higher reluctance in the sense that it is of lower flux carrying capacity than that through the rotor. This magnetic coupling serves to center the floating magnetic assembly comprising parts 14 and 15 with the poles 27 at the centers of poles 26 and prevent it from continuous rotation, but it is a resilient coupling and allows parts 14 and 15 to turn through an appreciable angle against the magnetic forces tending to center the auxiliary pole pieces 26 and 27. This magnetic coupling or centering device serves the same purpose as the springs between the stator and stationary support in Patent No. 1,120,615, Harris. However, the inertia of the floating parts 14 and 15 is very small as compared to the entire floating stator of the Harris patent, and, therefore, will respond much more quickly to changes in motor torque variations. In my arrangement it will be noted that the greater portion of the stator assembly is stationary, including that part supporting the energizing winding 17.

To start this motor into operation, the field is energized and an alternating flux is thus produced between the center and outer periphery of the open end of the cup-shaped assembly, a portion of this flux passing through the rotor. and a smaller portion through the centering device, which automatically centers itself as soon as the field is energized. The rotor assembly 12, 18, 20 and 21 is now given a spin, by hand or otherwise, and brought up to approximately synchronous speed or above, synchronous speed being that where a rotor tooth passes from one stator tooth to the next in synchronism with the alternating flux pulsations. In the motor represented, the motor has eighteen poles, and if it be energized at 60 cycles its synchronous speed will be 400 r. p. m.

Now, if it be assumed that the stator parts 14 and 15 are rigidly connected to the remaining stator parts, it will not be easy to establish synchronous speed, because the speed as well as the tooth and flux phase relations must be brought within narrow limits before the motor will pull into synchronism. However, by allowing the toothed portion of the stator to have an appreciable amount of resilient rotation, as described, and because of its low inertia, it will make a quick movement against the resistance of the magnetic coupling, to establish the correct phase relations between stator and rotor teeth and flux pulsations when the speed is approximately correct, and invariably establish synchronous operation, after which it will automatically center itself again without throwing the motor out of step.

The same means prevents sudden loads or circuit surges from throwing the motor out of step, because the low inertia, resiliently coupled salient pole element takes the shock in the resilient magnetic coupling.

It will be apparent to those skilled in the art that various structural changes might be made in the motor without departing from the essential features of the present invention, and, consequently, I seek claims commensurate with the true spirit and scope of the invention, and do not wish to limit my invention to the particular structure and assembly described, nor to any particular size of motor.

What I claim as new and desire to secure by Letters Patent of the United States, is:

1. A synchronous motor comprising cooperating stator and rotor members, the rotor having salient poles, the stator member having a fixed field part for producing the motor fluxes and a relatively rotatable salient pole part of low inertia interposed in the flux path between the rotor and fixed field part, and magnetic means for resiliently resisting rotation of said salient pole part.

2. A synchronous motor having salient pole rotor and stator members, the stator member having a fixed part for producing the motor fluxes and a relatively rotatable salient pole part of low inertia for conveying the motor fluxes into the salient poles of the rotor, and a magnetic coupling between the two named parts of the stator member for resiliently resisting rotation of the salient pole part, said coupling forming a high reluctance flux path in parallel with the flux path through the rotor.

3. A synchronous motor having a salient pole rotor and a stator field member, said stator member having an energizing winding on a portion thereof and salient poles on another portion thereof, said salient poles cooperating with the salient pole rotor, said two portions of the stator being relatively rotatable, and a resilient magnetic coupling between said portions tending to prevent relative rotation.

4. A synchronous motor comprising rotor and stator members, the rotor having salient poles and the stator member having a salient pole magnetic structure cooperating with the rotor and a field structure for producing the motor operating flux in said rotor and salient pole structure, said salient pole structure being relatively rotatable with respect to the field member on the axis of rotation of the rotor, and a resilient magnetic coupling between the two named parts of the stator member tending to prevent relative rotation of said parts, said magnetic coupling being supplied with flux from the field member.

5. A synchronous motor having a stator portion providing concentrically disposed pole portions separated by a concentric air gap together with means for producing an alternating flux across said air gap, the outer pole portion having a smooth inner periphery, and the inner pole portion having a plurality of salient poles, a magnetic rotor having a smooth outer periphery and a salient pole inner periphery rotatively mounted in said air gap, the concentrically disposed pole portions of said stator being relatively rotatable and a magnetic coupling between them for resiliently resisting relative rotation.

6. A synchronous motor comprising a stator member having a magnetic circuit of cup-shaped design with a central inner core portion extending from the bottom of the cup, an inwardly extending magnetic portion with a smooth periphery at the open end of the cup, and an outwardly extending salient pole magnetic portion rotatively supported at the outer end of the central core portion, said extensions being separated by a concentric air gap, a magnetic rotor member having a smooth outer periphery and a salient pole inner periphery rotatively supported in said air gap, a single phase energizing winding within the cup and surrounding the central core portion, and means for resiliently resisting rotation of said outwardly extending salient pole magnetic portion.

7. A synchronous motor comprising a stator member having a magnetic circuit and supporting structure of cup-shaped design with a central inner core portion extending from the bottom of the cup, an inwardly extending magnetic portion with a smooth periphery at the open end of the cup, and an outwardly extending salient pole magnetic portion at the outer end of the central core portion, said extending portions being separated by a concentric air gap, a magnetic rotor with smooth outer periphery and salient pole inner periphery rotatively mounted in said air gap, a single phase exciting winding within said cup and surrounding said central core portion, said central core portion having relatively rotatable telescoping parts, one secured to the base of the cup and the other secured to said outwardly extending salient pole portion, and means for resiliently opposing relative rotation of said telescoping core portions.

8. A synchronous motor comprising a stator member having a magnetic circuit and supporting structure of cup-shaped design with a central inner core portion extending from the bottom of the cup, an inwardly extending magnetic portion with a smooth periphery at the open end of the cup, and an outwardly extending salient pole magnetic portion at the outer end of the central core portion, said extending portions being separated by a concentric air gap, a magnetic rotor with smooth outer periphery and salient pole inner periphery rotatively mounted in said air gap, a single phase exciting winding within said cup and surrounding said central core portion, said central core portion having relatively rotatable telescoping parts, one secured to the base of the cup and the other secured to said outwardly extending salient pole portion, and means for resiliently opposing relative rotation of said telescoping core portions, said means comprising a high reluctance magnetic coupling between the outer periphery of the cup and the central core portion which is secured to the outwardly extending salient pole portion.

9. A synchronous motor having outer and inner stator magnetic parts concentrically arranged and separated by a concentric air gap, together with means for forcing an alternating flux across said air gap, a salient pole magnetic rotor rotatively mounted in said air gap and intercepting the flux crossing the same, one of said stator parts having salient poles facing the salient poles of the rotor, said stator parts being relatively rotatable and a magnetic coupling between said relatively rotatable stator parts for resiliently resisting relative rotation thereof, said coupling comprising salient poles extending towards each other from the two parts and forming a flux path in parallel to that through the rotor, the flux path through the magnetic coupling being of higher reluctance than that through the rotor.

10. A synchronous motor, a stator therefor having relatively rotatable salient pole and flux producing field portions, a rotor having salient magnetic poles facing the salient pole portion of the stator, said stator portions and rotor being included in the main series magnetic circuit of the motor, and a magnetic coupling between said stator portions for resiliently resisting relative rotation of said portions, said coupling comprising relatively wide salient poles on one of said portions and relatively narrow salient poles on the other portion, the rotor having the same axis of rotation as that of the relatively rotatable stator portions and the magnetic coupling serving to assist in establishing and maintaining synchronous operation.

In witness whereof I have hereunto set my hand.

HENRY E. WARREN.